(12) United States Patent
Ni

(10) Patent No.: US 6,728,260 B2
(45) Date of Patent: Apr. 27, 2004

(54) SWITCH AND/OR ROUTER UNIT

(75) Inventor: Jie Ni, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/355,447

(22) Filed: Jan. 31, 2003

(65) Prior Publication Data

US 2003/0147407 A1 Aug. 7, 2003

Related U.S. Application Data

(63) Continuation of application No. 09/105,391, filed on Jun. 26, 1998.

(51) Int. Cl.[7] .............................................. H04L 12/56
(52) U.S. Cl. ...................... 370/465; 370/466; 370/467
(58) Field of Search ................................ 370/465, 466, 370/467

(56) References Cited

U.S. PATENT DOCUMENTS 5,910,954 A * 6/1999 Bronstein et al. ........... 370/401
6,041,328 A    3/2000 Yu
6,145,016 A    11/2000 Lai et al.

* cited by examiner

Primary Examiner—Melvin Marcelo
(74) Attorney, Agent, or Firm—Christopher K. Gagne

(57) ABSTRACT

Briefly, in accordance with one embodiment of the invention, a system includes: shared memory. The system includes the capability to transfer to a router processing unit a fragment of a received frame and a pointer to the fragment in shared memory.

Briefly, in accordance with another embodiment of the invention, a method of transferring a fragment of a received frame includes the following. The received frame and the byte length of a fragment of the received frame are stored in shared memory. The fragment of the received frame having the byte length indicated and a pointer to the location of the fragment in shared memory are transferred.

Briefly, in accordance with yet another embodiment of the invention, a switch-router includes at least one integrated circuit. The at least one integrated circuit includes the capability, alone or in combination with one or more other integrated circuits, to transfer to a router processing unit a fragment of a received frame and a pointer to the location of the fragment in a shared memory.

18 Claims, 2 Drawing Sheets

SWITCH AND/OR ROUTER UNIT

The present patent application is a Continuation of application Ser. No. 09/105,391, filed Jun. 26, 1998.

BACKGROUND

1. Field

The invention relates to switches, routers, and/or switch-routers.

2. Background Information

In the design of switches, routers and/or switch-routers, memory bandwidth is an issue to consider. It is common for such devices or systems to be designed employing a shared memory architecture. In such an architecture, a central resource pool is employed to store signal frames or packets received via the ports of the switch and/or router. The use of a shared memory architecture in a switch and/or router is well-known. Shared memories are described, for example, in *Computer Networks*, by Andrew S. Tanenbaum, published by Prentice-Hall, Inc., Upper Saddle River, N.J., 3d Edition, 1996. However, because each port accesses memory, this may result in a high bandwidth for the shared memory or else the shared memory may not have the capacity to handle the packets. For example, for a 24 port downlink and two port uplink switch, the bandwidth desired for memory may be on the order of 4.8 gigabits per second. Further, in a system, device, or unit that has routing capability, these frames may be forwarded from shared memory to a processing unit for processing to support different network protocols and other forms of packet management. After this processing unit has made decisions or performed such processing, the frames are typically transferred back, via shared memory, to the corresponding ports of the system or unit, for transmission. Therefore, frames are transferred in and out of shared memory multiple times, consuming memory bandwidth. A need, therefore, exists for a method or technique to address this memory bandwidth issue.

SUMMARY

Briefly, in accordance with one embodiment of the invention, a system includes: shared memory. The system includes the capability to transfer to a router processing unit a fragment of a received frame and a pointer to the fragment in shared memory.

Briefly, in accordance with another embodiment of the invention, a method of transferring a fragment of a received frame includes the following. The received frame and the byte length of a fragment of the received frame are stored in shared memory. The fragment of the received frame having the byte length indicated and a pointer to the location of the fragment in shared memory are transferred.

Briefly, in accordance with yet another embodiment of the invention, a switch-router includes at least one integrated circuit. The at least one integrated circuit includes the capability, alone or in combination with one or more other integrated circuits, to transfer to a router processing unit a fragment of a received frame and a pointer to the location of the fragment in a shared memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
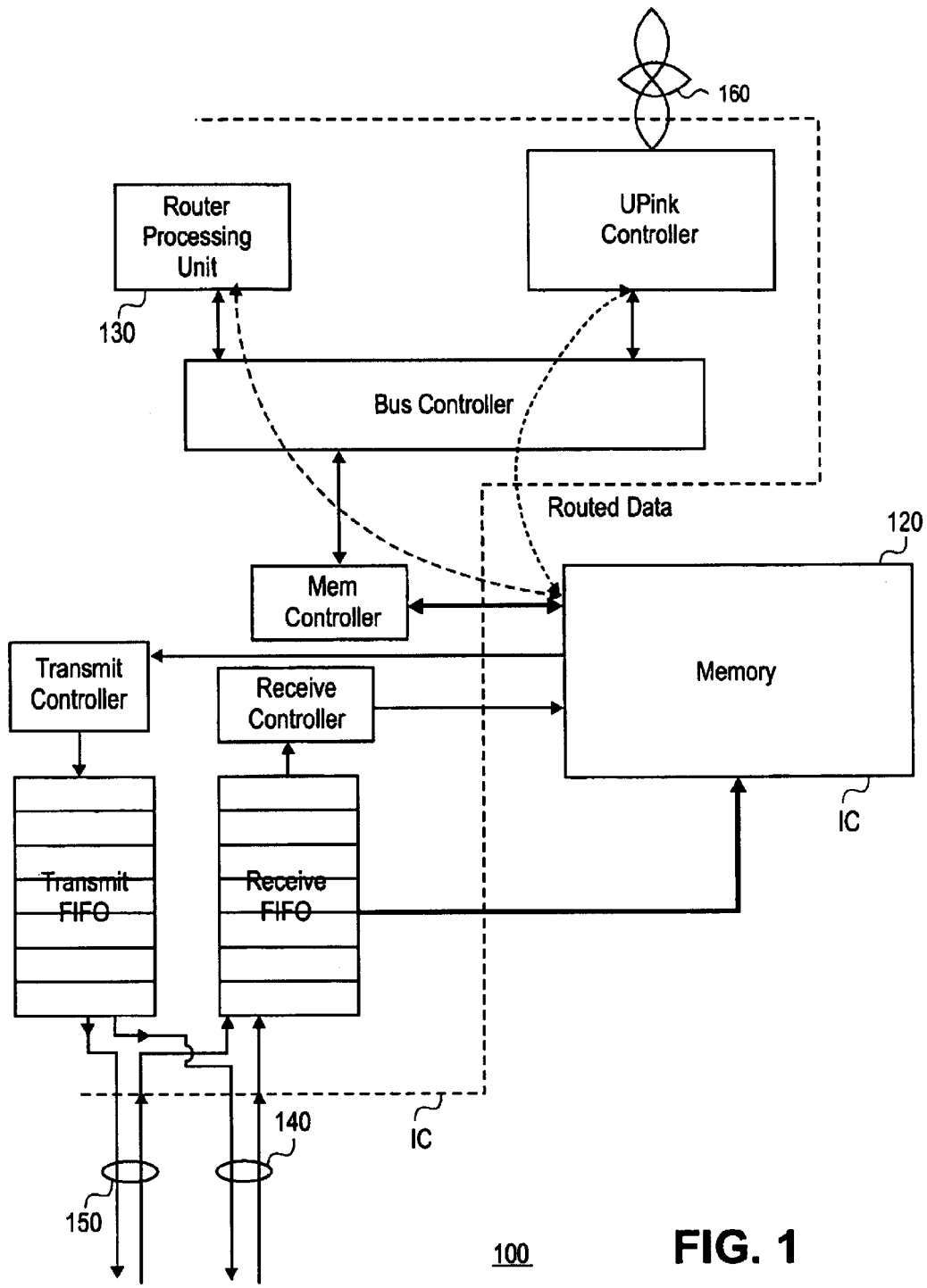
FIG. 1 is a block diagram illustrating an embodiment of a switch and/or router in accordance with the present invention.

FIG. 1 is a block diagram illustrating an embodiment of a switch and/or router in accordance with the present invention. This particular embodiment illustrates two integrated circuit chips, although the invention is not limited in scope in this respect. For example, an embodiment in accordance with the invention may comprise only one IC or a combination of multiple ICs, depending on the particular embodiment. Embodiment 100 includes shared memory 120 and router processing unit 130. Although embodiment 100 includes a number of ports, ports 140 and 150 are specifically illustrated in this figure. Furthermore, these ports, as illustrated, are bi-directional. Likewise, FIG. 1 also illustrates a port 160. By way of example, and not to limit the scope of the invention in any way, port 160 is illustrated as coupled to an uplink controller and may be employed to transmit packets at a rate on the order of gigabits, for example. As is well-known, a switch is employed for directing packets in a network, whereas a router includes the capability to route packets between two or more networks, such as networks that operate in accordance with different network protocols. Therefore, typically the switch operates at the media access controller (MAC) layer or link layer of the protocol stack, whereas the router typical operates at the network layer. It is common to refer to levels of switching and routing capability. Likewise, a switch-router, that is, a switch that includes routing capabilities, typically operates across these multiple layers.

For such devices as switches, routers, and/or switch-routers, a variety of architectures may be employed. One such architecture includes a relatively large amount of memory at each port to receive frames from source address locations and transmit frames to destination address. A disadvantage, of course, of this architecture is that it is relatively expensive to provide a large amount of memory at each port. In an alternative architecture, a shared memory is employed and a relatively small amount of memory is included for each particular port. Therefore, a frame is received via a port, buffered in the memory of the port, and then relayed to the shared memory.

In such a configuration, the memory bandwidth to the shared memory may become a consideration. For example, a system employing 24 downlink ports, each operating at 100 megahertz, may involve a bandwidth of up to 4.8 gigabytes per second. Likewise, if two uplink ports operating at one gigabyte per second are employed, this results in a bandwidth of four gigabytes per second. Therefore, the bandwidth for the shared memory should be on the order of 8.8 gigabytes per second in this example.

As suggested earlier, techniques or methods for conserving memory bandwidth are desirable. In a switch having router capability, for example, referred to in this context as a switch-router, once a frame is received and stored in shared memory, typically the frame is transferred to a router processing unit, such as the one illustrated in FIG. 1.

Figure 2:
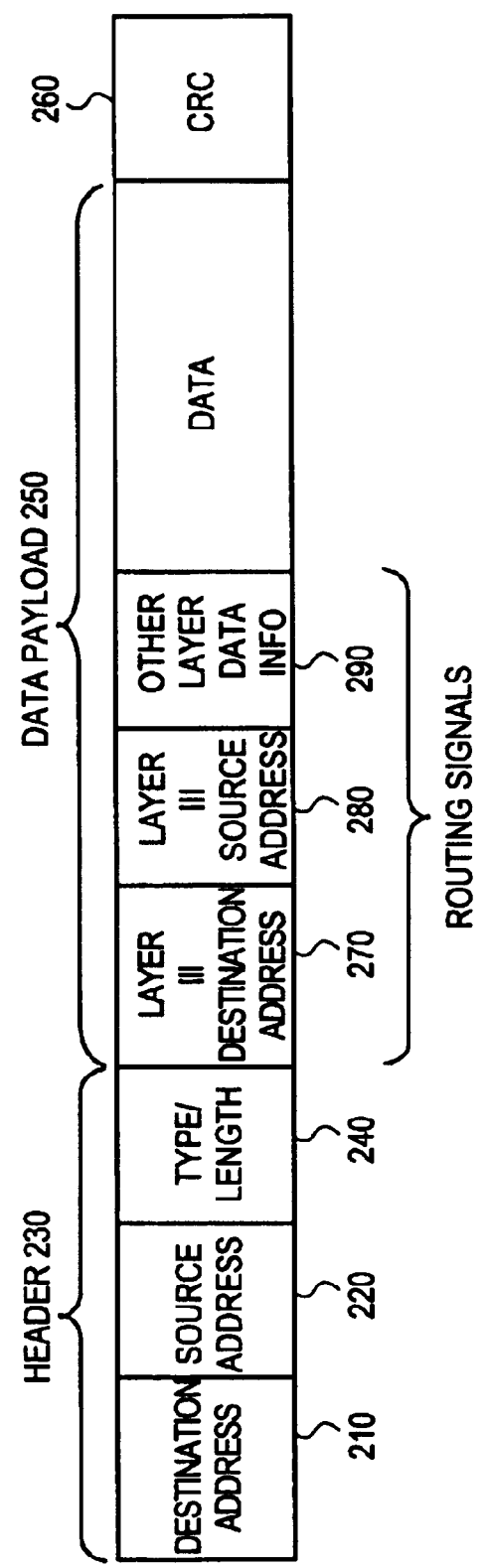
FIG. 2 is a schematic diagram illustrating an embodiment of an arrangement for a signal packet that may be processed by an embodiment of a switch and/or router in accordance with the present invention.

In this context, the term transfer includes copying from a memory location. FIG. 2 is a schematic diagram illustrating an embodiment of an arrangement of a frame or packet that may be employed in conjunction with an embodiment of a switch and/or router in accordance with the invention. Although the invention is not limited in scope in this respect, embodiment 200 includes a 64-byte header. Likewise, although the portion of the frame other than the header may have a variable length, a typical length is approximately 1.5 K bytes. As illustrated in FIG. 2, header 230 includes a source address 220, a destination address 210, and a frame type/length of the payload portion of the frame 240. As illustrated, a payload portion 250 is then followed by a (cyclical redundancy check) CRC portion 260.

The invention is not limited in scope to this particular embodiment of the frame, although this is an example of a typical approach employed in networks that employ switches and/or routers. As is further well-known, in order for a switch to route a packet or frame, such as the embodiment illustrated in FIG. 2, typically the switch examines the portion of the packet or frame described in FIG. 2 as the header. However, where a router or switch-router is employed, typically the portion of the packet designated as the payload portion is examined in order to appropriately direct the packet. Although the invention is not limited in scope in this respect, it is usually sufficient to examine the first 64 bytes of the payload in order to provide routing capability. This portion of the payload is illustrated in FIG. 2 as layer III destination address 270, layer III source address 280, and other layer data information 290, although this is just provided as one possible example, and the invention is not limited in scope in this respect. In a switch and/or router, such as, for example, the embodiment illustrated in FIG. 1, this operation is typically performed in router processing unit 130, which typically comprises hardware and software to accomplish this, although the invention is not limited in scope in this respect.

A difference between the embodiment illustrated in FIG. 1 and a typical switch and/or router is that embodiment 100 includes the capability to transfer to the router processing unit a fragment of a received frame and a pointer to the location of the fragment in shared memory. Therefore, rather than transfer the entire packet, including header 230, payload 250, and CRC 260, for the embodiment illustrated in FIG. 2, for example, instead 64 bytes or less of the payload, in this particular embodiment, may be transferred from shared memory 120 to router processing unit 130. In addition, the pointer to the location of this frame or packet in shared memory is passed along with the fragment of the received frame.

In this particular embodiment, although the invention is not limited in scope in this respect, there are variable-sized fragments in the packet providing routing signal information. These may be transferred using an address table stored, for example, in shared memory, that contains the byte length of the frame fragment to be sent and indicates that this is a frame fragment. Of course, the invention is not limited in this respect. However, in this embodiment the frame is not released from the shared memory, although the pointer to the frame is passed with the transmission. Thus, the router processing unit completes its processing of the fragment in order to appropriately direct the packet through the switch and/or router to the appropriate port, such as to a gateway that may be coupled to a port, for example. Then this processed fragment is returned, directed by the pointer to shared memory. These bytes will then replace the bytes of the original frame received, and stored in shared memory. The frame, including the replacement bytes, is then transmitted to the port which the router processing unit has designated.

While certain features of the invention have been illustrated and described herein, many modifications, substitutions, changes, and equivalents will now occur to those skilled in the art. As previously suggested, one advantage of this embodiment in accordance with the present invention is that is conserves bandwidth for the bus controller in this embodiment. Nonetheless, an alternative embodiment, for example, may conserve bandwidth without even employing a bus controller. It is, therefore, to be understood that the appended claims are intended to cover all such modifications and changes as fall within the true spirit of the invention.

What is claimed is:

1. A system comprising:
    a shared memory; and
    a router processing unit;
    wherein the system includes circuitry to transfer multiple frame fragments from multiple received frames to the router processing unit, the frame fragments having respective lengths that are the same, the circuitry also being to transfer to the router processing unit with one of the multiple frame fragments of one of the multiple received frames a pointer to a location of the one of the multiple frame fragments in the shared memory.

2. The system of claim 1, wherein the respective length of the one of the multiple frame fragments comprises no more than 64 bytes.

3. The system of claim 1, wherein the circuitry is also to receive from the router processing unit a replacement frame fragment to be located in the shared memory at the location indicated by the pointer.

4. The system of claim 1, wherein the system comprises a switch-router.

5. The system of claim 1, wherein the router processing unit is to examine the one of the multiple frame fragments in order to direct a packet to a port of a switch-router.

6. A method comprising:
    transferring to a router processing unit from a shared memory multiple frame fragments from multiple received frames, the frame fragments having respective lengths that are the same; and
    transferring to the router processing unit with one of the multiple frame fragments of one of the multiple received frames a pointer to a location of the one of the multiple frame fragments in the shared memory.

7. The method of claim 6, wherein:
    the pointer is passed to the router processing unit along with the one of the multiple frame fragments.

8. The method of claim 6, wherein the system comprises a switch-router.

9. The method of claim 6, wherein the one of the multiple frame fragments comprises a portion of the payload of the one of the multiple received frames.

10. The method of claim 9, wherein the one of the multiple frame fragments comprises an initial 64 bytes of the payload of the one of the multiple received frames.

11. The method of claim 9, wherein the one of the multiple frame fragments comprises an initial sequence of bytes of the payload of the one of the multiple received frames.

12. The method of claim 11, wherein the one of the multiple frame fragments has a length less than 64 bytes.

13. The method of claim 6, further comprising, examining by the router processing unit the one of the multiple frame fragments in order to direct a packet to a port of a switch-router.

14. A switch-router comprising: at least one integrated circuit; the at least one integrated circuit including circuitry to:
  transfer to a router processing unit from a shared memory multiple frame fragments from multiple received frames, the frame fragments having respective lengths that are the same; and
  transfer to the router processing unit with one of the multiple frame fragments of one of the multiple received frames a pointer to a location of the one of the multiple frame fragments in the shared memory.

15. The switch-router of claim 14, wherein the switch-router includes plurality of ports that are coupled to one or more networks.

16. The switch-router of claim 15, wherein the switch-router is also to receive the one of the multiple received frames via one of the plurality of ports.

17. The switch-router of claim 16, wherein the circuitry is also to pass the pointer along with the one of the multiple frame fragments to the router processing unit.

18. The switch-router of claim 14, wherein the router processing unit is to examine the one of the multiple frame fragments in order to direct a packet to a port of the switch-router.

* * * * *